United States Patent Office 2,784,138
Patented Mar. 5, 1957

2,784,138

FUNGICIDAL COMPOSITIONS OF N-ARYL-HYDROXYARYLMETHYLAMINES

Richard Wegler, Leverkusen, and Ferdinand Grewe and Erik Regel, Koln-Flittard, Germany, assignors to Farbenfabriken Bayer Aktiengesellschaft, Leverkusen, Germany, a corporation of Germany No Drawing. Application March 2, 1954, Serial No. 413,718

Claims priority, application Germany March 7, 1953

7 Claims. (Cl. 167—31)

The present invention relates to new and useful improvements in the control of plant diseases; more particularly the invention is concerned with N-aryl-hydroxyarylmethylamines of the formula

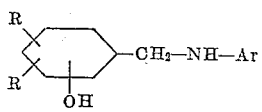

wherein R represents hydrogen, a lower alkyl, halogen or nitro group, Ar stands for a halo- or nitro-substituted phenyl radical or an arsenic acid group or an alpha-pyridyl radical which have been found to be effective fungicides.

Phenol and its substitution products, for instance cresol, tri- or pentachlorophenol as well as dinitro-o-cresol, are known to have marked fungicidal properties. The general application of these products in the control of plant diseases is handicapped by their, mostly considerable, injurious (phytotoxic) effects on plants. The application of these phenols, therefore, is limited substantially to the preservation of wood or, if applied in the control of plant diseases, to the seasons in which the plants have no green parts.

In accordance with the present invention it has been found that the fungicidal properties of phenols and its substitution products are preserved if they contain as a weakly basic group an aromatic amine residue attached to the phenol radical via a methylene bridge. The aryl radicals of the phenol and the amine component may be substituted for instance by alkyl, halogen or nitro groups. The aromatic radicals may belong to the benzene series or to any other aromatic ring system. The nitrogen atom of the compounds may be secondary or tertiary. By introducing the amine residue in accordance with the invention the injurious action of the above phenols on leaves is very surprisingly either eliminated completely or at least reduced to such an extent that may be employed as fungicides without any risk during the whole year. In accordance with the invention another advantage of the N-aryl-hydroxy-arylmethylamines is the suppression of the strong skin-irritating properties which are otherwise characteristic of phenols. This is presumably due to an internal salt formation between the phenol and the amine compound. In many cases it is of advantage to employ the water-soluble salts of the N-aryl-hydroxy-arylmethylamines since these salts are especially active and easy to handle. For the preparation of salts the phenolic group and especially the amino group can be used.

The N-aryl-hydroxyarylmethylamines are preferably prepared via the corresponding chloromethylphenols if the starting products are phenols the reactivity of which is reduced to such an extent that a chloromethyl compound can be produced therefrom. This is the case for instance with o- or p-nitrophenol or the corresponding nitrocresols or p-cresols, furthermore with dinitrophenols, nitro-o- or -p-chlorophenol, with dichlorophenol and, quite generally, with compounds containing at least two substituents in o- and p-position or in both o-positions or a substituent of the second order in o- or p-position. In phenols carrying substituents in p-position and both o-positions, for instance mesitol and trichlorophenol, a chloromethyl group can be introduced in m-position to the hydroxyl group. These and the aforesaid phenols are capable of yielding di-(chloromethyl)-phenols and can further be reacted with two mols of the same or two different amines. In the case of particularly reactive phenols, instead of the chloromethyl phenols the methylol compounds which are more easily obtainable may be reacted with the amines at elevated temperatures to form the corresponding N-aryl-hydroxy-aryl-methylamines and water.

The reaction of chloromethyl phenols with the aromatic amines can be accomplished by slightly heating the components; it is advantageous to apply the aromatic amines in a large excess in order to avoid the formation of by-products.

The fungicidal properties of the products according to the invention are sometimes enhanced by esterifying the N-aryl-hydroxyarylmethylamines at the phenolic hydroxyl group by conventional methods. This esterification step is preferably carried out before or after chloromethylation, i. e. prior to the reaction with the aromatic amines.

The invention is further illustrated by the following examples without being restricted thereto.

Example 1

N-(4-chlorophenyl)-N-5-nitro-2-hydroxybenzylamine-chlorohydrate (M. P.: 158° C. with decomposition after recrystallizing from methanol) is active against Phytophtora infestans and Peronospora on the plant and not phytotoxic. When tested with spores in a concentration of 0.0005%, 80% of the spores no longer germinate; 50% of the spores lose their germination capability if the product is applied in a concentration of 0.00025%.

Example 2

When testing N-(2-nitrophenyl)-N-5-nitro-2-hydroxybenzylamine (M. P.: 168° C. after recrystallizing from xylene; red powder) with spores in a concentration of 0.0005%, 90% of the spores no longer germinate; 65% of the spores lose their germination capability if the product is applied in a concentration of 0.00025%.

Example 3

N-(3-nitrophenyl)-N-5-nitro-2-hydroxybenzylamine (M. P.: 179° C.; yellow powder) is active against Phyt. and Per. on the plant and not phytotoxic. When tested with spores in a concentration of 0.0005%, 80% of the spores no longer germinate; 50% of the spores lose their germination capability if the product is applied in a concentration of 0.00025%.

Example 4

N-(4-nitrophenyl)-N-5-nitro-2-hydroxybenzylamine (M. P.: 192° C.) is not phytotoxic. When tested with spores in a concentration of 0.0005%, 80% of the spores no longer germinate; 55% of the spores lose their germination capability if the product is applied in a concentration of 0.00025%.

Example 5

N-(2,4-dichlorophenyl)-N-5-nitro-2-hydroxybenzylamine (M. P.: 148° C.) is present in the form of yellow crystals after recrystallizing from xylene. When tested with spores in a concentration of 0.0005%, 90% of the spores no longer germinate.

Example 6

When testing N-(5-nitro-2-hydroxybenzyl)-arsanilic acid (M. P.: 245° C.) with spores in a concentration of 0.0005%, 45% of the spores no longer germinate.

Example 7

When testing N-α-(piridyl-N-5-chloro-3-nitro-2-hydroxybenzylamine (M. P.: 228° C.) with spores in a concentration of 0.0005%, 26% of the spores no longer germinate.

Example 8

When testing N-α-piridyl-N-5-nitro-3-methyl-2-hydroxybenzylamine (M. P.: 200° C.) with spores in a concentration of 0.0005%, 33% of the spores no longer germinate.

Example 9

When testing N-(4-chlorophenyl)-N-3,5-dichloro-2-hydroxybenzylamine (M. P.: 114° C.) with spores in a concentration of 0.0005%, 70% of the spores no longer germinate.

We claim:

1. A fungicidal composition containing as an active fungicidal ingredient a substance of the formula

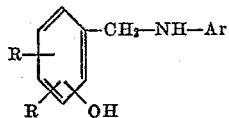

in which R is a member selected from the group consisting of hydrogen, lower alkyl, halogen and nitro, Ar is a member selected from the group consisting of (1) a halo-substituted phenyl radical, (2) a nitro-substituted phenyl radical, (3) an arsanilic acid radical, and (4) an alpha-pyridyl radical—and a carrier.

2. A fungicidal composition containing as an active fungicidal ingredient a substance of the formula

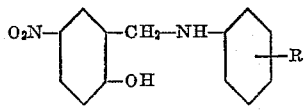

in which R is a member selected from the group consisting of $NO_2$ and Cl, and a carrier.

3. A fungicidal composition containing as an active fungicidal ingredient a substance of the formula

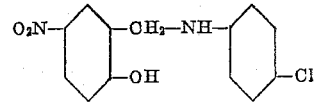

and a carrier.

4. A fungicidal composition containing as an active fungicidal ingredient a substance of the formula

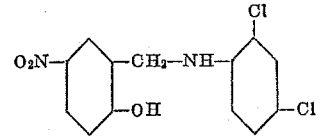

and a carrier.

5. A fungicidal composition containing as an active fungicidal ingredient a substance of the formula

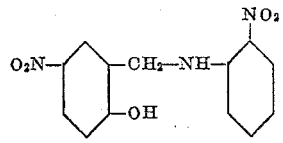

and a carrier.

6. A fungicidal composition containing as an active fungicidal ingredient a substance of the formula

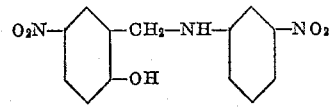

and a carrier.

7. A fungicidal composition containing as an active fungicidal ingredient a substance of the formula

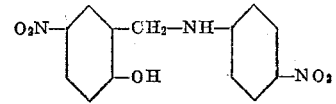

and a carrier.

References Cited in the file of this patent

UNITED STATES PATENTS

| | | |
|---|---|---|
| 2,155,356 | Britton et al. | Apr. 18, 1939 |
| 2,643,965 | O'Brien et al. | June 30, 1953 |